C. COTTA.
CHANGE SPEED GEARING.
APPLICATION FILED JAN. 4, 1911.
Reissued Jan. 16, 1912.
13,363.
2 SHEETS—SHEET 1.
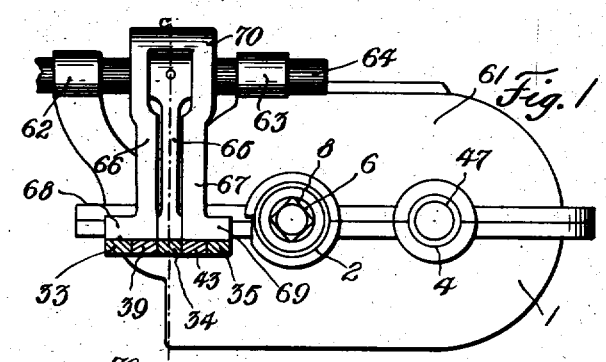
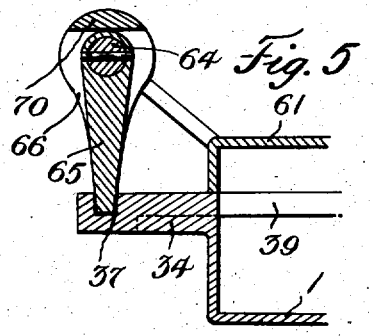
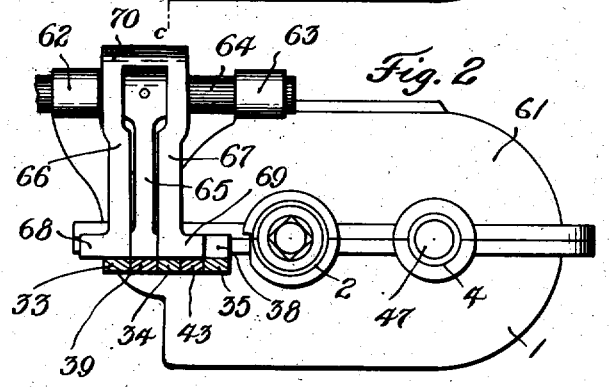
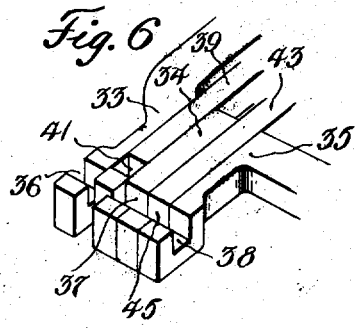
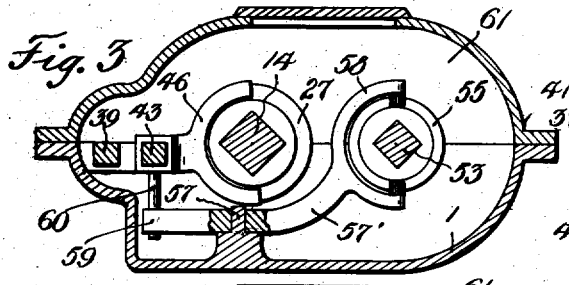
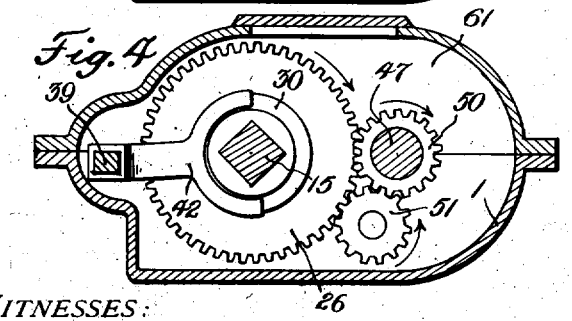
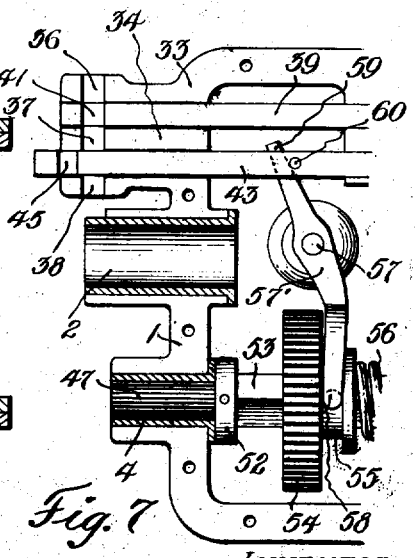
WITNESSES:
E. Larson
M. A. Beeler
INVENTOR
Charles Cotta,
BY Geo. L. Beeler
Attorney

C. COTTA.

CHANGE SPEED GEARING.

APPLICATION FILED JAN. 4, 1911.

Reissued Jan. 16, 1912.

13,363.

2 SHEETS—SHEET 2.

WITNESSES:

E. Larson

M. A. Beeler

INVENTOR

Charles Cotta,

BY Geo. L. Beeler

Attorney

UNITED STATES PATENT OFFICE.

CHARLES COTTA, OF ROCKFORD, ILLINOIS, ASSIGNOR TO COTTA TRANSMISSION CO., INC., OF ROCKFORD, ILLINOIS.

CHANGE-SPEED GEARING.

13,363. Specification of Reissued Letters Patent. Reissued Jan. 16, 1912.

Original No. 934,505, dated September 21, 1909, Serial No. 320,637. Application for reissue filed January 4, 1911. Serial No. 600,833.

*To all whom it may concern:*

Be it known that I, CHARLES COTTA, a citizen of the United States, residing at Rockford, in the county of Winnebago and State of Illinois, have invented certain new and useful Improvements in Change-Speed Gearing, of which the following is a specification.

The object of this invention is to construct a change-speed gearing adapted more particularly for motor cars, in which all the gears with the exception of the pinion directly connected with the motor, remain at a standstill when the driven shaft is in direct communication with the driver or motor shaft, and this is accomplished by the employment of two double-faced slidable clutch-sections and disengaging the driven spur gear from the pinion on the motor shaft, all other gears and pinions remaining in mesh all the time.

A further object of this invention is to lock one of the slidable clutch-sections against movement when the other slidable clutch-section is being moved.

Figure 8:
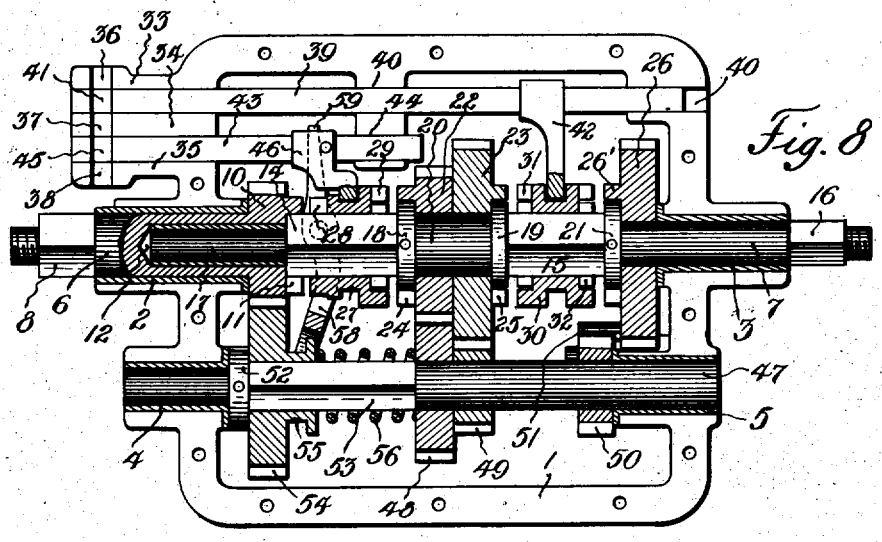
Figure 9:
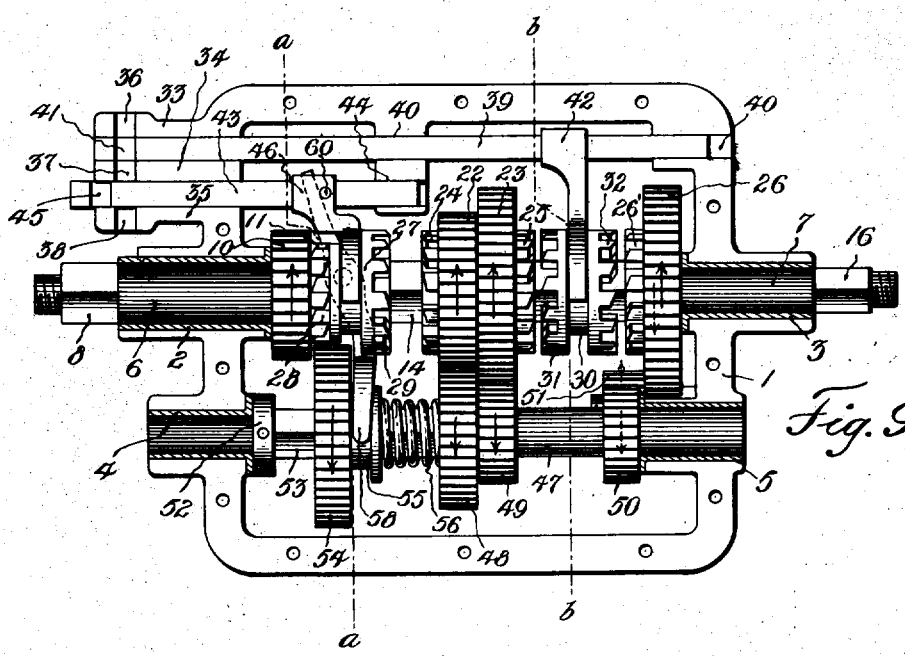

In the accompanying drawings, in which similar reference characters refer to like parts wherever they appear, Figures 1 and 2 are end elevations of the casing as seen from the driving end, or that end next the motor, and partly in section. Fig 3 is a transverse section on the line *a—a* of Fig. 9. Fig. 4 is a transverse section on the line *b—b* of Fig. 9. Fig. 5 is a vertical section on the line *c—c* of Fig. 1. Fig. 6 is an isometric representation of the slidable clutch operating bars and a portion of the lower section of the casing. Fig. 7 is a top view of a portion of the lower section of the casing showing the counter-shaft and the means for sliding the gear thereon. Fig. 8 is a top view of the lower section of the casing, with the operative parts supported thereby and in which the slidable clutch-sections are in their normal position. Fig. 9 is a view like Fig. 8, but in which one of the slidable clutch-sections is in engagement with the direct pinion and the gear on the counter-shaft is disengaged from the direct pinion.

The lower section 1 of the casing is provided with bearings 2, 3, 4, and 5. The bearings 2 and 3 support the driving shaft 6 and the driven shaft 7. The driving shaft has a squared section 8, for the attachment of the motor, a spur pinion 10, and a clutch section 11 in this instance formed integral with the pinion. This pinion will be designated hereinafter as the driving pinion, although it is to be plainly understood that the shaft 6 may be regarded as the driven shaft, with the motor connected to the shaft 7, without departing from the spirit of the invention. The shaft 6 is provided with a central cavity 12 extending axially thereof from one end through the pinion 10. The motor, not shown, will rotate the driving shaft and pinion in the direction indicated by the arrows. The driven shaft has three squared sections 14, 15, and 16. A round section 17 is located in the round cavity 12, and another round section is located in the bearing 3. The squared section 16 receives the coupling, not shown, connecting it with the wheels of the car. Two collars 18 and 19 are secured to the round section 20 at the adjacent ends of the sections 14 and 15, and a collar 21 is secured at the opposite end of the section 15.

Two gears 22 and 23 are located loosely on the round section 20 and held against longitudinal movement by the collars 18 and 19. The gear 22 has a clutch face 24, in this instance formed integral therewith. The gear 23 has a clutch face 25, also shown as integral therewith.

A gear 26 has a clutch face 26′ and is located on the shaft 7 between the collar 21 and the bearing 3, and may rotate independently of the shaft.

The squared section 14 of the driven shaft supports a slidable clutch-section 27, which has two clutch faces 28 and 29. The squared section 15 of the driven shaft supports the slidable clutch-section 30, which has two clutch faces 31 and 32.

The lower section of the casing has three extending portions 33, 34, and 35, provided with transverse grooves 36, 37, and 38, respectively. Between the portions 33 and 34 is located a slidable bar 39, which has other bearings 40 formed in the casing. This bar 39 has a cross-groove 41, and to the bar is secured a shipping arm 42 which engages the slidable clutch-section 30. Between the portions 34 and 35 is located a slidable bar 43, which has another bearing 44 formed in the casing. This bar 43 has a cross-groove 45, and to this bar is secured a shipping arm 46 which engages the slidable clutch-section 27.

The bearings 4 and 5 support a jack shaft or counter-shaft 47 and to it are secured three gears 48, 49, and 50. The gear 48 meshes with gear 22 on the driven shaft, and the gear 49 meshes with the gear 23 on the driven shaft. The gear 50 meshes with an intermediate or idler gear 51, which meshes with the gear 26.

A collar 52 is secured to the counter-shaft 47 and bears against the bearing 4. This collar in connection with the gear 50 serves to hold the counter-shaft against longitudinal movement. On the squared section 53 of the counter-shaft is located slidably and non-rotatably a toothed-wheel or power transmitting gear 54. This gear has an annular groove 55 formed in one face, and a spring 56 surrounds the squared section 53, one end resting against the gear 48 and its other end resting against the gear 54. The action of this spring is to hold the gear 54 normally against the collar 52 in a yielding manner.

From the bottom of the lower section 1 of the casing extends a stud 57. A shipping lever 57′ is pivoted on this stud. The end 58 of the shipping lever is located in the groove 55, and its other end 59 is located beneath the slidable bar 43. From the slidable bar 43 extends a pin 60, which is located to engage at certain times the end 59 of the shipping lever.

The upper section 61 of the casing is located over the lower section and is provided with bearings which hold the driving, driven, and intermediate shafts in place. The upper section also holds the slidable bars 39 and 43 in their supports.

From the upper section of the casing project two tubular supports 62 and 63. A rock shaft 64 is located in these supports so as to oscillate and reciprocate therein. To this rock shaft is fixed a finger 65, which in the position shown in Figs. 1 and 5 is located in the cross-groove 37 of the portion 34. A yoke is supported by the rock shaft 64 and comprises two arms 66 and 67, having the foot pieces 68 and 69, respectively, and a cross-bar 70 connects the arms. The finger 65 is located between the arms 66 and 67 of the yoke. When the yoke is in the position indicated in Fig. 1 the foot 68 of the arm 66 will be located in the cross-grooves 36 and 41 of the portion 33 and slidable bar 39, and the foot 69 of the arm 67 will be located in the cross-grooves 38 and 45 of the portion 35 and slidable bar 43. When the yoke and finger are in the position shown in Fig. 1 the bars 39 and 42 will be locked against sliding movement, as the feet 68 and 69 each embrace one of the stationary portions 33 and 35, as well as one of the slidable bars. The rock shaft 64 will also be held against oscillatory movement as the finger 65 is located in the cross-groove of the stationary portion 34.

In order to slide the bar 39 the shaft 64 is moved longitudinally until the finger 65 is located in the cross-groove 41 of the bar 39. This movement of the rock shaft will move the foot 69 of the arm 67 into connection with the stationary portion 34 and the slidable bar 43, thereby locking the slidable bar 43 against movement. As the finger 65 is now in the cross-groove 41 of the slidable bar 39, by oscillating the rock shaft 64 the finger may be oscillated in either direction, thereby imparting a sliding movement to the bar 39 in either direction. By sliding this bar inwardly the clutch-section 30 will be moved into engagement with the clutch face 26′ of the gear 26, and by moving the bar 39 outwardly the clutch-section will be moved into engagement with the clutch face 25 of the gear 23. In order to move the slidable bar 43 the shaft 64 is moved to carry the finger 65 into the cross-groove 45 of the bar 43. This movement will carry the yoke with it, so that the foot 68 of the arm 66 will move into the cross-grooves 41 and 37 of the slidable bar 39 and the stationary portion 34, thereby holding the slidable bar 39 against endwise movement. By oscillating the rock shaft 64 the finger 65 will move the bar 43 in either direction, and if moved inwardly the clutch-section 27 will engage the clutch face 24 of the gear 22, and if moved outwardly the clutch-section will engage the clutch face 11 of the pinion 10. When the slidable bar 43 is moved outwardly from its normal or central position the pin 60 will engage the end 59 of the shipping lever, causing it to oscillate, thereby moving the gear 54 from engagement with the pinion 10 into the position shown in Figs. 7 and 9. When the slidable bar 43 is moved inwardly to its normal position from its outward position the spring 56 will move the gear 54 into engagement with the pinion 10. The further inward movement of the slidable bar 43 will move the pin 60 away from the lever end 59, and the clutch-section 27 will be moved into engagement with the clutch face 24 of the gear 22. When the clutch-section 30 is in engagement with the clutch face of the gear 23 motion will be transmitted from the driving shaft through the gears 10, 54, 49, and 23 to the driven shaft 7, which will give the slowest speed forward. When the clutch-section 27 is in engagement with the clutch face 24 of the gear 22 motion will be transmitted from the driving shaft through the gears 10, 54, 48, and 22 to the driven shaft, which will give the intermediate speed forward. When the clutch-section 27 is in engagement with the clutch face 11 of the pinion 10 the gear 54 will be moved out of engagement with the pinion, and a direct connection will be formed between the driving and the driven shafts. When the clutch-section 30 is in engagement with the clutch face 26′ of the gear 26 motion will be transmitted from the driving shaft through the gears 10, 54, 50, 51, and 26 to the driven shaft, thereby imparting a reverse rotation to the driven shaft. By this arrangement when a direct connection is made the counter-shaft 47 and all the gears, with the exception of the pinion 10, will remain at a standstill, as the gear 54 will be out of engagement with the pinion. While the slidable bar 39 is being moved the slidable bar 43 is held against movement, and while the slidable bar 43 is being moved the slidable bar 39 is held against movement, which positively prevents the accidental engagement of the gearing imparting different speeds at the same time.

I claim:

1. A speed changing mechanism comprising a main driving shaft, a jack shaft, a plurality of sets of gears on both shafts in constant engagement through which different speeds may be obtained, clutches for connecting said main shaft with the different speed gears, a power transmitting gear on the jack shaft meshing with the high speed gear, and means for withdrawing said transmitting gear from engagement with said high speed gear when the clutch is connected to the latter.

2. A speed changing mechanism comprising a main driving shaft, a jack shaft, gears on both shafts in constant engagement through which different speeds may be obtained, clutches for connecting said main shaft with the different speed gears, a power transmitting gear on the jack shaft meshing with the high speed gear, and means for automatically withdrawing said transmitting gear from engagement with said high speed gear when the clutch is connected to the latter.

3. A speed changing mechanism comprising a main driving shaft, a jack shaft, gears on both shafts in constant engagement through which different speeds may be obtained, clutches for connecting said main shaft with the different speed gears, a power transmitting gear on the jack shaft meshing with the high speed gear, and a lever operatively connecting one of said clutches with said transmitting gear whereby the latter is withdrawn from engagement with said high speed gear as said clutch is moved into engagement with said speed gear.

4. A speed changing mechanism comprising a main driving shaft, a jack shaft, a plurality of sets of gears on said shafts in constant engagement through which different speeds may be obtained, clutches for connecting said main shaft with the different speed gears, a power transmitting gear on the jack shaft meshing with the high speed gear, a pivoted lever operatively connecting one of said clutches with said transmitting gear whereby the latter is withdrawn from engagement with said high speed gear as said clutch is moved into engagement with said speed gear, and a spring for returning said transmitting gear to its engaging position when said clutch is released.

5. In change speed gearing, the combination of a shaft 6, a shaft 7, a counter shaft, gearing connecting the counter shaft and shaft 7 to impart to the shaft 7 two different speeds in one direction and one speed in the reverse direction, clutches for connecting the gears of the shaft 7 with the shaft 7, means for locking one clutch against movement while the other is being moved, means for forming a direct connection between the shafts 6 and 7, and a gear connection between the shaft 6 and the counter shaft, the counter shaft being at rest when a direct connection is formed between the shafts 6 and 7.

6. In change speed gearing, the combination of a shaft 6, a shaft 7, a counter shaft, gearing connecting the counter shaft and shaft 7 to impart to the shaft 7 two different speeds in one direction and one speed in the reverse direction, clutches for connecting the gears of the shaft 7 with the shaft 7, means for locking one clutch against movement while the other is being moved, means for forming a direct connection between the shafts 6 and 7, a gear connection between the shaft 6 and the counter shaft, the counter shaft being at rest when a direct connection is formed between the shafts 6 and 7, and a spring for restoring the connection between the shaft 6 and the counter shaft.

CHARLES COTTA.

Witnesses:
STANTON A. HYER,
A. D. SCOVILLE.